Nov. 3, 1925.
W. C. BRINTON
1,560,035
MOTOR CASING CLOSURE
Filed Dec. 16, 1921
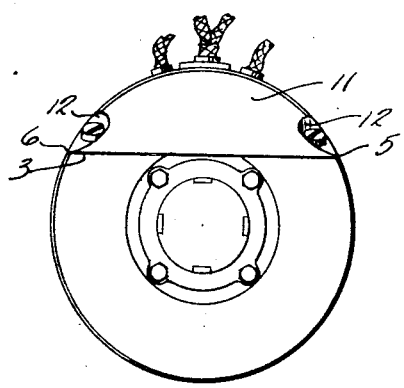
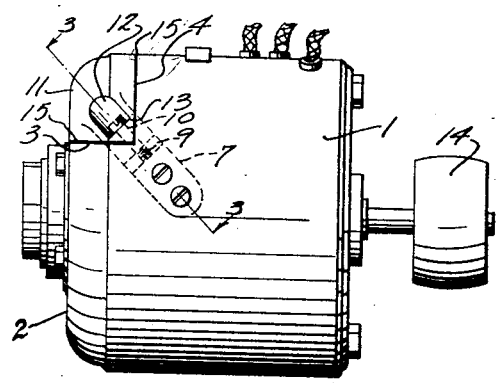
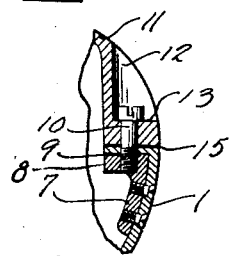
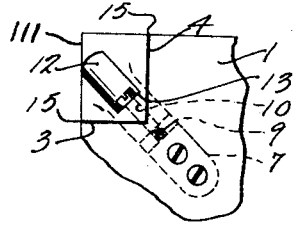
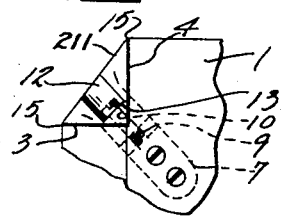
INVENTOR
Willard C Brinton
BY E. W. Marshall
ATTORNEY Patented Nov. 3, 1925.

1,560,035

UNITED STATES PATENT OFFICE.

WILLARD C. BRINTON, OF NEW YORK, N. Y., ASSIGNOR TO TERMINAL ENGINEERING COMPANY, INC., OF NEW YORK, N. Y., A CORPORATION OF NEW YORK.

MOTOR-CASING CLOSURE.

Application filed December 16, 1921. Serial No. 522,835.

*To all whom it may concern:*

Be it known that I, WILLARD C. BRINTON, a citizen of the United States, and a resident of New York, county of New York, and State of New York, have invented certain new and useful Improvements in Motor-Casing Closures, of which the following is a specification.

My invention relates to improvements in motor casings for electric motors particularly for motors to be used in damp, dusty, or gaseous places where it is desired to substantially seal the motor casing and prevent the entry of dirt, fumes or water.

An object of my invention is to provide a motor closure adapted to substantially seal the motor casing and which may be readily removed when desired.

Another object of my invention is to provide a motor closure having no externally projecting parts, thus adapting a casing provided with my closure means for a wide variety of uses.

A further object of my invention is to provide a simple, substantial, and readily manufactured motor casing closure having a minimum number of finished surfaces and thus lending itself to ease of sealing, and reducing the cost of manufacture.

With the foregoing and other objects in view, which will become apparent to those skilled in the art as the description proceeds, my invention resides in the combination and arrangement of parts and in the details of construction described in the specification and particularly pointed out in the appended claims, a preferred embodiment of the invention being shown in the accompanying drawings. It is to be understood, however, that I do not limit myself to the precise embodiment shown and described as changes may be made within the scope of what is claimed without departing from the spirit of the invention. I intend no limitations other than those of the claims.

In the accompanying drawings:

Fig. 1 designates a rear end elevation of a motor provided with a casing enclosure therefor embodying my invention.

Fig. 2 designates a side elevational view of the motor of Fig. 1 showing means for holding the closure in place.

Fig. 3 is a section taken on the lines 3—3 of Fig. 2.

Fig. 4 is a modified form of motor closure and corresponds to the portion of Fig. 2, which shows the closure, and Fig. 5 is another modification of the same part of Fig. 2.

Similar reference characters relate to similar parts throughout the views.

In a motor as illustrated in Fig. 2, 1, represents a casing of cylindrical shape having an end 2 of substantially spherical shape, a portion of said end 2 being cut away as by the provision of an opening having edges 3, 4.

Within the casing 1 and riveted, bolted, cast, or otherwise secured to the inner cylindrical surface of the casing 1 adjacent to the positions of the angles 5 and 6 are angle members 7, 7. One leg of each of said angle members such as 8, 8, projects inwardly from said casing, the face of said leg being substantially parallel to the line joining the angles 5, 6, of the opening above mentioned. In each of the legs 8, 8, of the angle pieces 7, 7 are threaded openings 9, 9 adapted to receive machine bolts 10, 10.

A closure plate 11 is provided substantially of the same shape as the opening in the motor casing 1, said plate having edges to coact with the edges 3, 4 of the opening to be closed. A gasket 15 may be provided between the edges of the plate and of the opening.

In the plate 11 are recesses 12, 12 into which the heads of the bolts 10, 10 may seat, the shank of said bolts extending through said plate 11 to take in the threaded openings 9, 9 of the angle pieces 7, 7. A shoulder 13 at the bottom of each recess against which the head of the bolt rests is substantially parallel to the face of the inwardly projecting leg 8 on each side of the closure.

The motor casing enclosure shown in Fig. 4 is of rectangular shape instead of being curved and comprises a section 111 which corresponds to the plate 11 of Fig. 2. The plate 111 is provided with a corresponding recess 12 and is fastened with threaded bolts extending from the plate 111 into the threaded opening 9, 9 of the angular recess 7, 7. A shoulder 13 at the bottom of each recess against which the head of the bolt rests is substantially parallel to the face of the inwardly projecting leg 8 on each side of the closure.

Referring to Fig. 5 the closure plate 211 is of triangular cross section and is provided with recesses 12, 12, into which the bolts 10, 10 may seat to secure the plate 211 in a manner similar to that previously described.

In operation it is apparent that the closure 11 may be readily removed and replaced as desired and that in replacement the action of bolts 10, 10 will be to draw the closure plate 11 down into the opening provided at an angle to the axis of the cylindrical casing and in a direction at right angles to the faces of the legs 8, 8. The position of the bolts in the closure plate 11 allows the use of a minimum of bolts to position tightly the plate and to draw said plate with a more or less wedging action directly into the opening provided thus compressing the gasket 13 and substantially sealing the casing.

What I claim is:

1. In a motor casing a cylindrical portion enclosing a motor body, an end portion affixed to said cylindrical portion and adapted to enclose the commutator end of the motor, a removable section of said end portion bounded by planes perpendicular to the axis of the cylindrical portion and parallel thereto respectively, lugs within said casing by which the removable section is held and holding means for securing the section to the end portion substantially bisecting the angle between said planes.

2. A motor casing, comprising a main cylindrical portion and an adjoining end portion of equal diameter, a removable section of the end portion bounded by planes perpendicular to and parallel with the axis of the main cylindrical portion respectively, a removable section having a recess, and holding means within said recess for maintaining the removable section affixed, said holding means substantially bisecting the angle between said planes.

In witness whereof, I have hereunto set my hand this 13th day of December, 1921.

WILLARD C. BRINTON.